(12) United States Patent
Loprieno et al.

(10) Patent No.: US 11,637,632 B2
(45) Date of Patent: Apr. 25, 2023

(54) OPTICAL TRANSCEIVER WITH DIRECT OTU4 MAPPING

(71) Applicant: Cisco Technology, Inc., San Jose, CA (US)

(72) Inventors: Gilberto Loprieno, Millano (IT); Paolo Sironi, Gallarate (IT); Emanuele Umberto Giacometti, Ciriè (IT); Francesco Mariani, Desio (IT)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/647,277

(22) Filed: Jan. 6, 2022

(65) Prior Publication Data
US 2023/0036648 A1     Feb. 2, 2023

Related U.S. Application Data

(60) Provisional application No. 63/203,739, filed on Jul. 29, 2021.

(51) Int. Cl.
*H04B 10/61*     (2013.01)
*H04B 10/40*     (2013.01)

(52) U.S. Cl.
CPC ........... *H04B 10/40* (2013.01); *H04B 10/616* (2013.01)

(58) Field of Classification Search
CPC .............................. H04B 10/40; H04B 10/616
USPC ......................................................... 398/135
See application file for complete search history.

(56) References Cited

U.S. PATENT DOCUMENTS

| | | | |
|---|---|---|---|
| 9,749,060 B1 * | 8/2017 | Wang | H04B 10/614 |
| 10,764,189 B1 * | 9/2020 | Rivaud | H04L 45/02 |
| 2015/0372764 A1 * | 12/2015 | Kaneda | H04B 10/616 398/115 |
| 2016/0380698 A1 | 12/2016 | Elahmadi et al. | |
| 2019/0260570 A1 | 8/2019 | Gareau et al. | |
| 2020/0028585 A1 * | 1/2020 | Abdullah | H04L 7/0075 |
| 2020/0228221 A1 | 7/2020 | Gareau et al. | |
| 2020/0266926 A1 | 8/2020 | Su et al. | |
| 2021/0281343 A1 | 9/2021 | Zhang et al. | |
| 2022/0278767 A1 * | 9/2022 | Tochio | H04B 10/27 |

* cited by examiner

*Primary Examiner* — Dalzid E Singh
(74) *Attorney, Agent, or Firm* — Patterson + Sheridan, LLP

(57) ABSTRACT

A method includes mapping, by an optical transceiver, a received first OTU4 signal to a first FlexO frame without interleaving the first OTU4 signal into an ODUC signal prior to mapping the first OTU4 signal to the first FlexO frame. The method also includes communicating, by the optical transceiver, the first FlexO frame with the mapped first OTU4 signal to a coherent DSP over a first FOIC.

20 Claims, 4 Drawing Sheets

OPTICAL TRANSCEIVER WITH DIRECT OTU4 MAPPING

CROSS-REFERENCE TO RELATED APPLICATIONS

This application claims benefit of U.S. provisional patent application Ser. No. 63/203,739 filed Jul. 29, 2021. The aforementioned related patent application is herein incorporated by reference in its entirety.

TECHNICAL FIELD

Embodiments presented in this disclosure generally relate to optical transceivers. More specifically, embodiments disclosed herein relate to an optical transceiver with direct optical channel transport unit 4 (OTU4) mapping.

BACKGROUND

With the introduction of pulse amplitude modulation 4-level (PAM4) signals at 26.6 gigabaud per second, optical transceivers migrated to a quad small form factor pluggable double density (QSFP-DD) form factor for supporting 400 GE, 200 GE, or 4x100 GE communication. Eight lanes are used to support 400 GE, but subsequent implementations may support 800 GE based on eight lanes, each transporting 56 gigabaud per second.

An optical transport network (OTN) (e.g., using OTU4) may be supported by a quad small form factor pluggable 28 (QSFP28), which includes optical channel transport lane (OTL) that maps OTU4 over four lanes (e.g., OTL4.4) supporting non-return to zero (NRZ) at 27 952 493.392 kilobits per second. As a result, it is possible to host a single 100 G client (e.g., OTU4 client), but the card is designed to support 400 G (e.g., 25% of bandwidth is used). In subsequent implementations, the problem may become worse when only 100 G is used but 800 G is available. Thus, there is a limit on the optical transceiver (e.g., only one OTU4) and a further limit on the coherent digital signal processor (coherent DSP) module (e.g., maximum of eight lanes). Therefore, the optical transceivers are not optimized for transporting legacy OTN traffic.

Additionally, some implementations use an aggregation device to convert the NRZ signals from QSFP28 to PAM4 signals from the coherent DSP. The aggregation devices, however, are large in size and consume a large amount of electrical power to operate.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

According to an embodiment, a method includes mapping, by an optical transceiver, a received first OTU4 signal to a first flexible optical transport network (FlexO) frame without interleaving the first OTU4 signal into an optical data unit-C (ODUC) signal prior to mapping the first OTU4 signal to the first FlexO frame. The method also includes communicating, by the optical transceiver, the first FlexO frame with the mapped first OTU4 signal to a coherent DSP over a first FlexO electrical interface (FOIC). Other embodiments include a system that perform the method.

According to another embodiment, an optical transceiver includes a first port and a framer circuit. The first port receives a first OTU4 signal. The framer circuit maps the first OTU4 signal to a first FlexO frame and communicates the first FlexO frame with the mapped first OTU4 signal to a coherent DSP over a first FOIC. Other embodiments include a method performed by the optical transceiver.

Example Embodiments

This disclosure describes a system, optical transceiver, and method that map an optical channel transport unit 4 (OTU4) signal into a flexible optical transport network (FlexO) frame. For example, the optical transceiver may refrain from interleaving the OTU4 signal into an optical data unit-C (ODUC) signal before mapping the OTU4 signal to the FlexO frame. The optical transceiver then communicates the FlexO frame over a FlexO electrical interface (FOIC) to a coherent digital signal processor (coherent DSP), which terminates the signal correcting errors. In this manner, the optical transceiver converts the OTU4 signal to a PAM4 signal for the coherent DSP without using an aggregation device, which reduces circuit size and reduces electrical power consumption, in particular embodiments. Additionally, the optical transceiver may use the available bandwidth more efficiently than implementations that use QSFP28 implementations.

Figure 1:
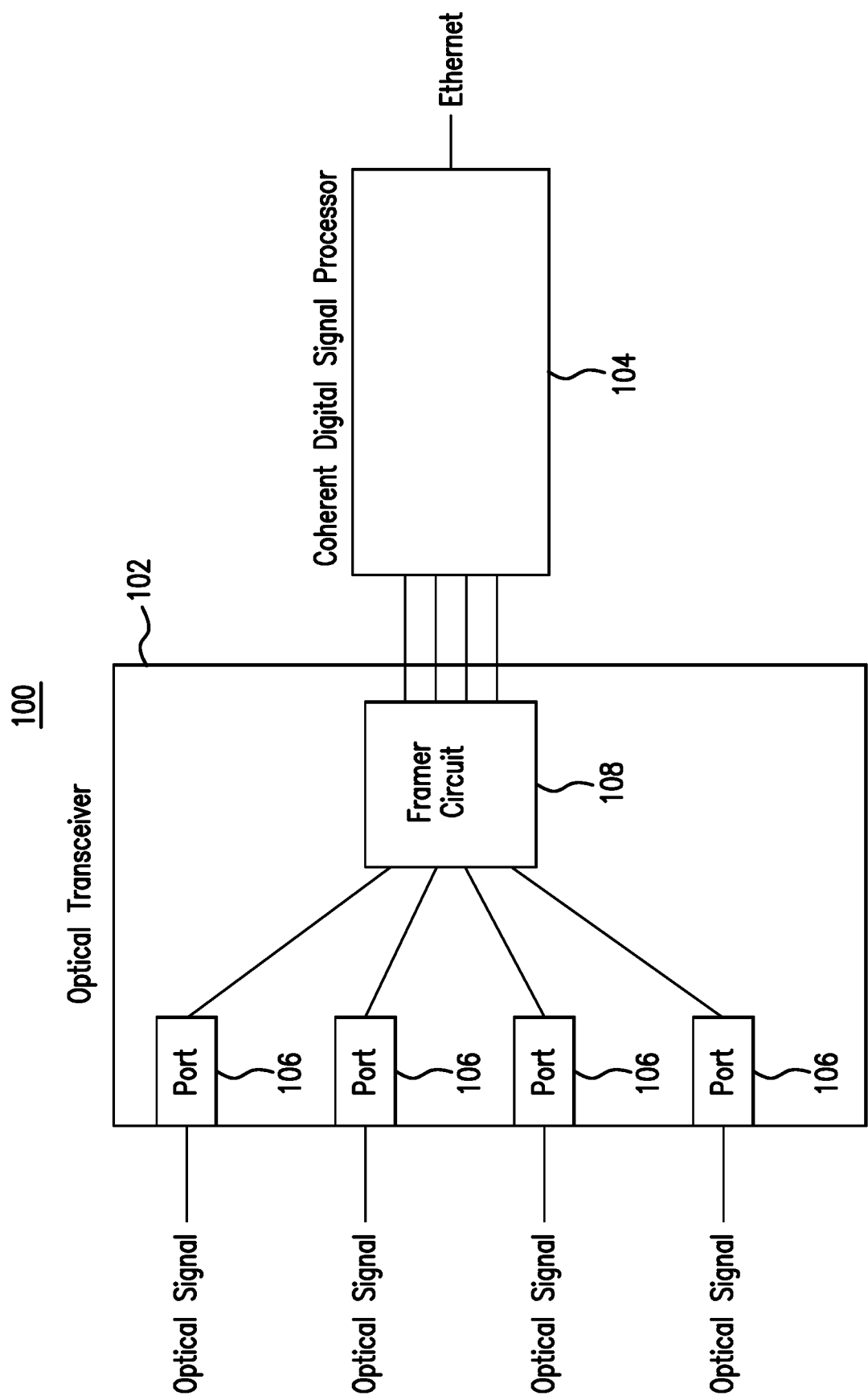
FIG. 1 illustrates an example system.

FIG. 1 illustrates an example system 100. As seen in FIG. 1, the system 100 includes an optical transceiver 102 and a coherent DSP 104. Generally, the optical transceiver 102 receives and converts optical signals into PAM4 signals. The optical transceiver 102 then communicates the PAM4 signals to the coherent DSP 104. The coherent DSP 104 terminates the PAM4 signals correcting forward error correction errors. In particular embodiments, the optical transceiver 102 converts OTU4 signals into PAM4 signals without using an aggregation device. As a result, circuit size and electrical power consumption are reduced and available bandwidth is efficiently used.

The optical transceiver 102 may be a pluggable module (e.g., in the QSFP form factor of quad small form factor pluggable double density (QSFP-DD)) that receives one or more optical signals. The optical transceiver 102 includes one or more ports 106 to which optical cables or fibers may connect. The optical fibers or cables carry optical signals into the ports 106 and into the optical transceiver 102. Although the example of FIG. 1 shows the optical transceiver 102 having four ports 106, the optical transceiver 102 may include any suitable number of ports 106 (e.g., eight ports 106 that receive eight optical signals). In certain embodiments, the optical transceiver 102 receives one or more OTU4 signals through the ports 106. The optical transceiver 102 converts the received OTU4 signals into PAM4 signals for the coherent DSP 104.

The optical transceiver includes a framer circuit 108 that converts the received optical signals into PAM4 signals for the coherent DSP 104. For example, the framer circuit 108 may map received OTU4 signals into a FlexO frame (e.g., a FlexO-1 frame) without interleaving the OTU4 signals into an ODUC signal. As a result, the framer circuit 108 maps OTU4 signals over a FlexO frame without an ODUCn mapping. The framer circuit 108 may perform the generic mapping procedure (GMP) to map the OTU4 signal to the FlexO frame. The framer circuit 108 may include an application specific integrated circuit (ASIC) or a field programmable gate array (FPGA) that implements a clock data recovery circuit to perform the mapping functions of the framer circuit 108. The clock data recovery circuit may include any suitable components (e.g., logic gates, rectifiers, differentiators, flip flops, and latches). In certain embodiments, the framer circuit 108 applies, to the OTU4 signal, forward error correction indicated by portions of the OTU4 signal and removes those portions from the OTU4 signal before mapping the OTU4 signal to the FlexO frame. As a result, the framer circuit 108 effectively maps an ODU4 version of the OTU4 signal to the FlexO frame. This process of applying, to the OTU4 signal, the forward error correction indicated by the OUT4 signal is optional. In some embodiments, the framer circuit 108 does not apply the forward error correction to the OTU4 signal or remove the portions of the OTU4 signal that indicate the forward error correction to be applied. As a result, the framer circuit 108 may be simplified.

In an example operation, the framer circuit 108 receives four OTU4 signals and applies forward error correction to each of the OTU4 signals. Each of the OTU4 signals may include portions that indicate the forward error correction to be applied to the OTU4 signal. The framer circuit 108 also removes these portions of the OTU4 signals from the OTU4 signals after applying the forward error correction. The framer circuit 108 then maps the four OTU4 signals over four synchronous FlexO-1 frames (e.g., frames that are generated with the same clock) or a FlexO-4 frame.

The framer circuit 108 communicates one or more FlexO frames to the coherent DSP 104 over one or more FOICs. In the example of FIG. 1, the framer circuit 108 communicates one or more FlexO frames over four FOICs. Each of the FOICs may include any suitable number of lanes. For example, each FOIC may include one lane (FOIC1.1) or two lanes (FOIC1.2). In some embodiments, the framer circuit 108 communicates one or more FlexO frames over a FOIC4.8 to the coherent DSP 104.

The coherent DSP 104 receives the PAM4 signals (e.g., four PAM4 signals) from the optical transceiver 102 and terminates those PAM4 signals. In this manner, the optical transceiver 102 and the coherent DSP 104 convert optical signals into electric data signals for devices. The coherent DSP 104 may be a coherent pluggable (e.g., a C form factor pluggable 1/2 digital coherent optics (CFP2 DCO) or a quad small form factor pluggable double density beyond 400 ZR (QSFP DDZR+)). The coherent DSP 104 may be implemented using an ASIC or FPGA. The coherent DSP 104 may perform several operations to process the PAM4 signals. For example, the coherent DSP 104 may map the PAM4 signals to one or more containers. As a result, the optical transceiver 102 and the coherent DSP 104 allow current switching and routing platforms to carry OTU4 clients without needing hardware modifications. Additionally, in some embodiments, the system 100 is based on two QSFP cages and no additional devices are included on a host card (except a clock data recovery (CDR) electrical regenerator).

In particular embodiments, the optical transceiver 102 and/or the coherent DSP 104 perform section monitoring to monitor the signals within the system 100 to detect errors (e.g., bit interleaved parity errors). An increasing number of errors may indicate that the quality of the connections in the system 100 is deteriorating and should be remedied. Additionally, the optical transceiver 102 and/or the coherent DSP 104 may monitor identifiers for the signals within the system 100 (e.g., the trail trace identifiers that identify signals from source to destination).

In some embodiments, the optical transceiver 102 does not terminate the OTU overhead in the signals in the system 100. If the optical transceiver 102 applies forward error correction to the OTU4 signals to produce ODU versions of the OTU4 signals, the optical transceiver 102 may not terminate the ODU overhead.

In certain embodiments, the optical transceiver 102 is a single QSFP that converts OTU4 signals into PAM4 signals. For example, the optical transceiver 102 may convert four or eight OTU4 signals into PAM4 signals. The optical transceiver 102 may map the OTU4 signals into FlexO frames without performing the intermediate step of mapping the OTU4 signals into ODUC signals. The optical transceiver 102 then communicates the FlexO frames to a coherent DSP 104 over FOICs. The FOICs may have any suitable number of lanes. The coherent DSP 104 may also be a single QSFP. As a result, the system 100 may be a host card that maps OTU4 signals to PAM4 signals using only two QSFP cages and no aggregation device, which reduces circuit size and electric power consumption.

Figure 2:
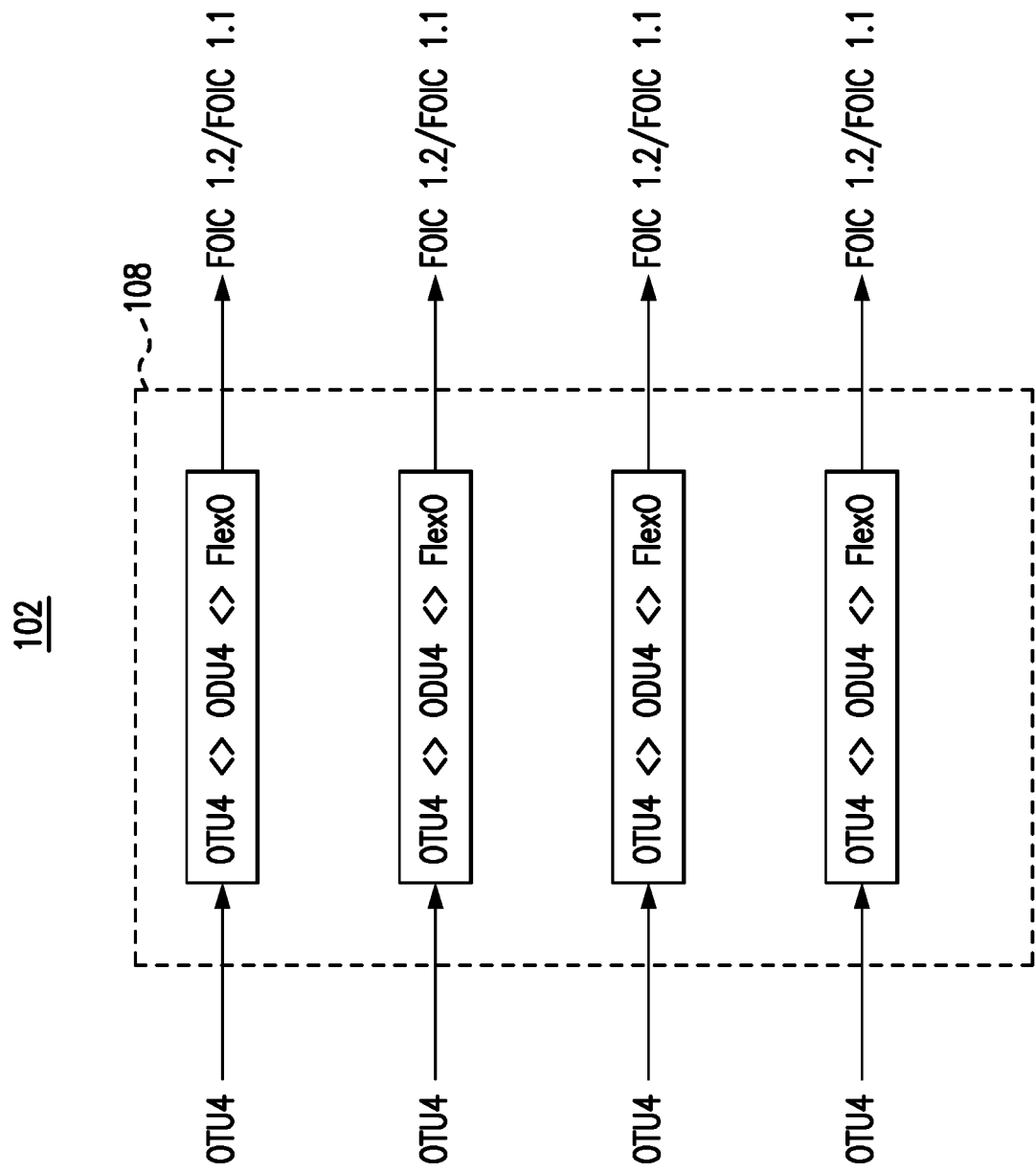
FIG. 2 illustrates an example optical transceiver in the system of FIG. 1.

FIG. 2 illustrates an example optical transceiver 102 in the system 100 of FIG. 1. As seen in FIG. 2, the optical transceiver 102 includes a framer circuit 108 that maps one or more OTU4 signals into FlexO frames, and then communicates the FlexO frames over FOIC. As discussed previously, the optical transceiver 102 may be a pluggable module, and the framer circuit 108 may be a component within the pluggable module. The framer circuit 108 may include hardware and circuit components that are arranged to map an OTU4 signal to a FlexO frame.

In some embodiments, the framer circuit 108 first applies forward error correction to the OTU4 signal before mapping the OTU4 signal to the FlexO frame. For example, the OTU4 signal may include one or more portions that indicate the forward error correction to be applied to the OTU4 signal. The framer circuit 108 may apply the forward error correction indicated by the OTU4 signal and then remove, from the OTU4 signal, the one or more portions of the OTU4 signal that contain the forward error correction information. In this manner, the framer circuit 108 effectively generates an ODU4 version of the OTU4 signal. The framer circuit 108 then maps the OTU4 signal to the FlexO frame. For example, the framer circuit 108 may use GMP to map the OTU4 signal to the FlexO frame. As a result, the framer circuit 108 maps the OTU4 signal to the FlexO frame without interleaving the OTU4 signal into an ODUC signal. In conventional implementations, the OTU4 signal may be mapped to an ODUC signal, and then the ODUC signal is mapped to a FlexO frame. The framer circuit 108, on the other hand, maps the OTU4 signal to the FlexO frame without performing the intermediate step of mapping the OTU4 signal to an ODUC signal.

In certain embodiments, the FlexO frame has the same structure, frequency, and forward error correction specified by G.709.1, which improves interoperability with different DSPs. The coherent DSP 104 that receives the FlexO frame may aggregate four or eight FlexO-1 frames without termination or in a transparent mode.

The framer circuit 108 communicates the FlexO frame with the mapped OTU4 signal to the coherent DSP 104 (shown in FIG. 1) over an FOIC. The FOIC may include any suitable number of lanes. For example, the FOIC may have two lanes (e.g., FOIC1.2) or one lane (e.g., FOIC1.1). In some embodiments, the framer circuit 108 communicates one or more FlexO frames (e.g., four FlexO frames) over an FOIC 4.8. In this manner, the framer circuit 108 converts one or more OTU4 signals into one or more PAM4 signals and communicates the one or more PAM4 signals to a coherent DSP 104. The coherent DSP 104 then terminates the PAM4 signals correcting forward error correction errors. The coherent DSP 104 may also map the PAM4 signals to one or more containers. In this manner, the framer circuit 108 assists in converting one or more optical signals into electric data signals.

As discussed previously, the framer circuit 108 maps OTU4 signals into FlexO frames without using an aggregation device (e.g., an aggregation device that converts sixteen NRZ signals into four or eight PAM4 signals for a coherent DSP). Because the aggregation device is large in size and consumes a large amount of electrical power, the framer circuit 108 provides reduced circuit size and reduced electrical power consumption by mapping OTU4 signals into FlexO frames without using the aggregation device. Additionally, by using the framer circuit 108, a host card may include only two QSFP cages (e.g., one cage for the optical transceiver 102 and another cage for the coherent DSP 104) rather than five QSFP cages.

Figure 3:
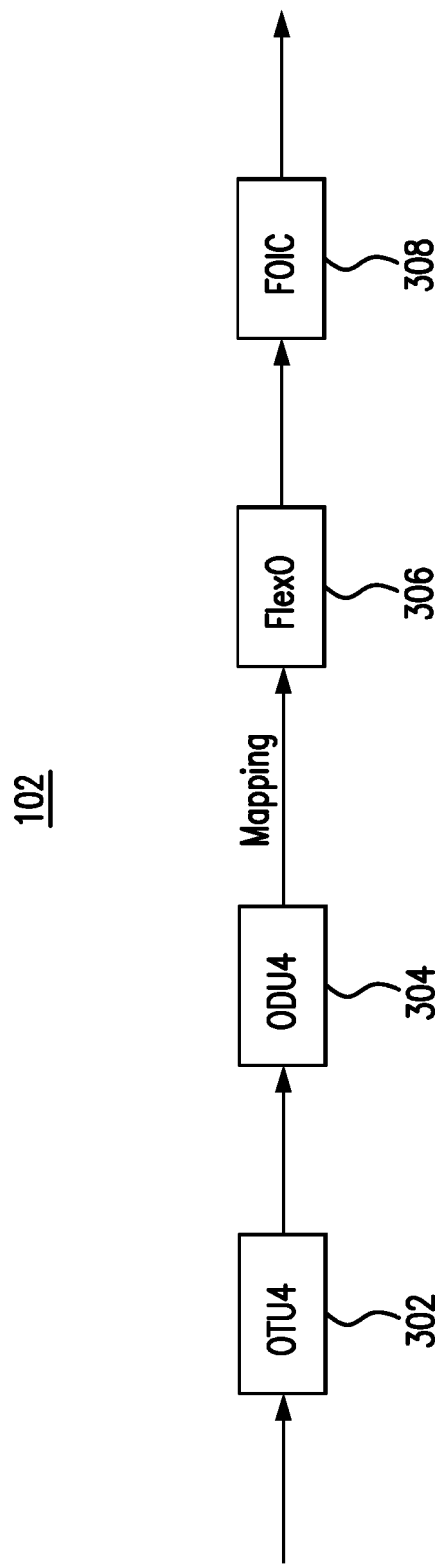
FIG. 3 illustrates an example optical transceiver in the system of FIG. 1.

FIG. 3 illustrates an example optical transceiver 102 in the system 100 of FIG. 1. As seen in FIG. 3, the optical transceiver 102 converts an OTU4 signal into a PAM4 signal. Specifically, the optical transceiver 102 receives an OTU4 signal 302. The optical transceiver 102 may receive the OTU4 signal 302 over an optical fiber or cable connected to a port of the optical transceiver 102.

The optical transceiver 102 then applies forward error correction to the OTU4 signal 302. In some embodiments, the OTU4 signal 302 includes one or more portions that indicate the forward error correction to be applied to the OTU4 signal 302. The optical transceiver 102 applies the indicated forward error correction to the OTU4 signal 302. Additionally, the optical transceiver 102 may remove the one or more portions from the OTU4 signal 302. As a result, the optical transceiver 102 generates an ODU4 version 304 of the OTU4 signal 302.

The optical transceiver 102 then maps the OTU4 signal 302 to a FlexO frame 306. The optical transceiver 102 may perform GMP to map the OTU4 signal 302 to the FlexO frame 306. In embodiments where the optical transceiver 102 applies forward error correction to the OTU4 signal 302, the optical transceiver 102 maps the OTU4 signal 302 to the FlexO frame 306 by mapping the ODU4 version 304 of the OTU4 signal to the FlexO frame 306. In this manner, the optical transceiver 102 maps the OTU4 signal 302 to the FlexO frame 306 without performing the intermediate step of interleaving the OTU4 signal 302 into an ODUC signal prior to mapping to the FlexO frame 306. As a result, the optical transceiver 102 converts the OTU4 signal 302 into a PAM4 signal.

The optical transceiver 102 then communicates the FlexO frame 306 to a coherent DSP over an FOIC 308. The FOIC 308 may include any suitable number of lanes, such as, one lane (FOIC1.1) or two lanes (FOIC1.2). In some embodiments, the optical transceiver 102 communicates one or more FlexO frames 306 with one or more mapped OTU4 signals 302 over a FOIC4.8. In this manner, the optical transceiver 102 communicates one or more FlexO frames 306 with one or more mapped OTU4 signals 302 over one or more FOICs 308 to a coherent DSP, which terminates the FlexO frames 306.

In some embodiments, the optical transceiver 102 reduces circuit size and electrical power consumption. Specifically, the optical transceiver 102 maps OTU4 signals 302 into FlexO frames 306 without using an aggregation device (e.g., an aggregation device that converts sixteen NRZ signals into four or eight PAM4 signals for the coherent DSP). As a result, the aggregation device need not be included on a host card with the optical transceiver 102. Because the aggregation device is large and consumes large amounts of electrical power to operate, removing the aggregation device from the host card and instead using the optical transceiver 102 provides reduced circuit size and reduced electrical power consumption. Additionally, by using the optical transceiver 102, the host card may include only two QSFP cages (e.g., one cage for the optical transceiver 102 and another cage for the coherent DSP 104) rather than five QSFP cages.

In the example of FIG. 3, the optical transceiver 102 and the framer circuit 108 convert four OTU4 signals into four PAM4 signals. The optical transceiver 102 and the framer circuit 108 map each OTU4 signal into a separate FlexO frame. Additionally, prior to mapping the OTU4 signals to the FlexO frames, the optical transceiver 102 and the framer circuit 108 may apply to each OTU4 signal forward error correction indicated by that OTU4 signal. The optical transceiver 102 and the framer circuit 108 may also remove from each OTU4 signal portions indicating the forward error correction to be applied to that OTU4 signal. As a result, the optical transceiver 102 and the framer circuit 108 map ODU4 versions of the OTU4 signals to the FlexO frames. Moreover, the four FlexO frames may be synchronous in that the four FlexO frames were generated using the same clock. The optical transceiver 102 and the framer circuit 108 then communicate the FlexO frames over separate FOICs (e.g., FOIC1.1 or an FOIC 1.2) to the coherent DSP.

The optical transceiver 102 may be a single QSFP that converts OTU4 signals 302 into PAM4 signals. For example, the optical transceiver 102 may convert four or eight OTU4 signals 302 into PAM4 signals. The optical transceiver 102 may map the OTU4 signals 302 into FlexO frames 306 without performing the intermediate step of mapping the OTU4 signals 302 into ODUC signals. The optical transceiver 102 then communicates the FlexO frames 306 to a coherent DSP 104 over FOICs 308. The FOICs 308 may have any suitable number of lanes. The coherent DSP 104 may also be a single QSFP. As a result, a host card that includes the optical transceiver 102 and the coherent DSP 104 may convert OTU4 signals 302 to PAM4 signals using only two QSFP cages and no aggregation device, which reduces circuit size and electric power consumption.

Figure 4:
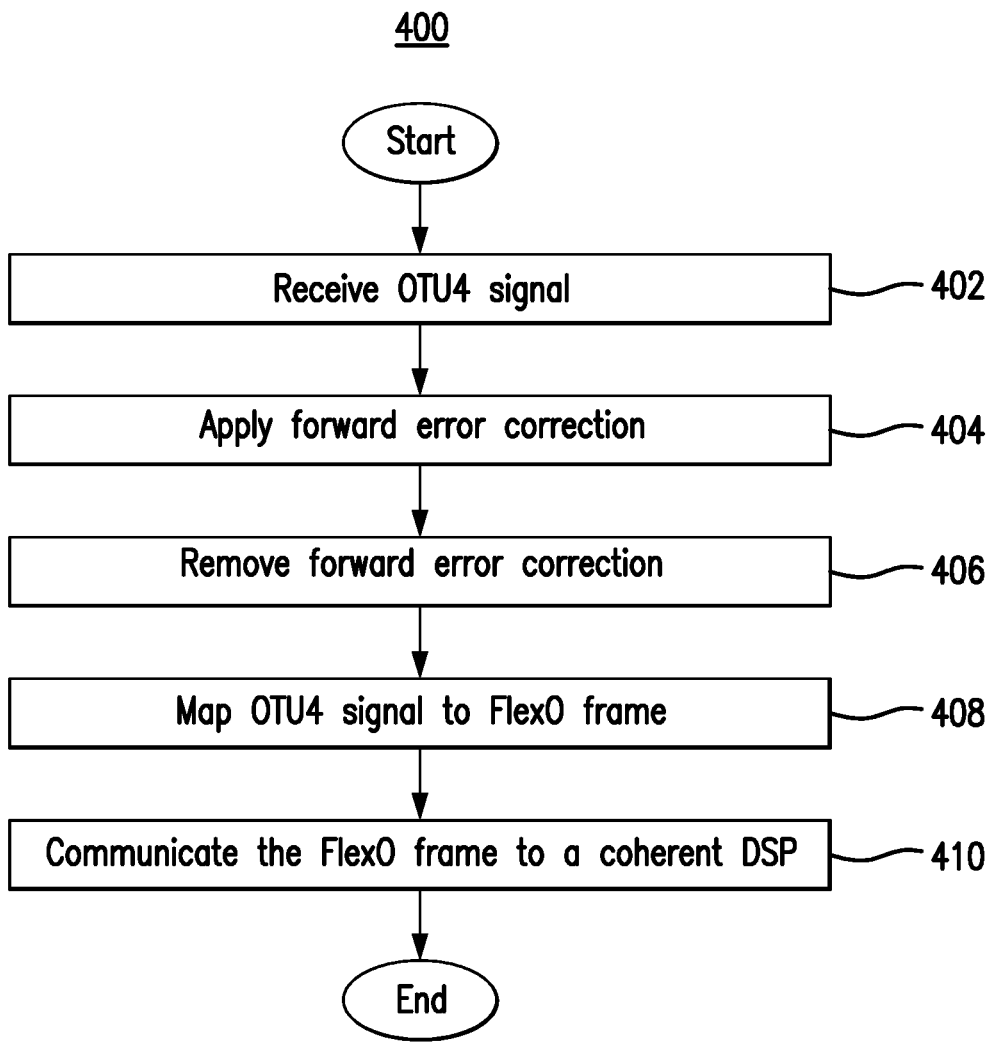
FIG. 4 is a flowchart of an example method performed in the system of FIG. 1.

FIG. 4 is a flowchart of an example method 400 performed in the system 100 of FIG. 1. In particular embodiments, the optical transceiver 102 performs the method 400. By performing the method 400, the optical transceiver 102 converts one or more OTU4 signals into one or more PAM4 signals for a coherent DSP 104. Specifically, the optical transceiver 102 maps the OTU4 signals to FlexO frames without performing the intermediate step of mapping the OTU4 signals to ODUC signals. The optical transceiver 102 may also apply forward error correction to the OTU4 signals prior to mapping the OTU4 signals to the FlexO frames. The optical transceiver 102 may communicate the FlexO frames to a coherent DSP 104 over FOICs.

In block 402, the optical transceiver 102 receives an OTU4 signal. The optical transceiver 102 may receive the OTU4 signal over an optical fiber or cable connected to an optical port of the optical transceiver 102. After receiving the OTU4 signal, the optical transceiver 102 performs one or more operations to convert the OTU4 signal into a PAM4 signal. The optical transceiver 102 may include any suitable number of ports and may receive and convert any suitable number of OTU4 signals (e.g., four or eight OTU4 signals over four or eight ports).

In block 404, the optical transceiver 102 applies forward error correction to the OTU4 signal. The OTU4 signal may include one or more portions that indicate the forward error correction to be applied to the OTU4 signal. The optical transceiver 102 may detect the one or more portions and the forward error correction to be applied. The optical transceiver 102 then applies the indicated forward error correction to the OTU4 signal. In block 406, the optical transceiver 102 removes, from the OTU4 signal, the one or more portions of the OTU4 signal indicating the forward error correction to be applied to the OTU4 signal. As a result, the forward error correction is applied to the OTU4 signal and the portions of the OTU4 signal indicating the forward error correction to be applied are removed from the OTU4 signal. In this manner, the optical transceiver 102 generates an ODU4 version of the OTU4 signal.

In block 408, the optical transceiver 102 maps the OTU4 signal to a FlexO frame. Specifically, the optical transceiver 102 maps the OTU4 signal to the FlexO frame without performing the intermediate step of interleaving the OTU4 signal into an ODUC signal. As a result, the optical transceiver 102 converts the OTU4 signal into a PAM4 signal.

Because the optical transceiver 102 converts the OTU4 signal into a PAM4 signal, there is no need to include a large aggregation device on a host card with the optical transceiver 102. The aggregation device would convert NRZ signals from multiple QSFP28 modules into PAM4 signals for the coherent DSP 104, but the aggregation device would be large and consume large amounts of electrical power. As a result of using the optical transceiver 102, the aggregation device need not be included or used, which reduces circuit size and electrical power consumption.

In block 410, the optical transceiver 102 communicates the FlexO frame to a coherent DSP. In some embodiments, the optical transceiver 102 communicates the FlexO frame to the coherent DSP over an FOIC. The FOIC may include any suitable number of lanes, such as, for example, one lane (FOIC1.1) or two lanes (FOIC1.2). In some embodiments, the optical transceiver 102 communicates one or more FlexO frames over a FOIC4.8. The coherent DSP receives the FlexO frame and then terminates the FlexO frame. As a result, the coherent DSP converts the PAM4 signal to an electric data signal to be consumed by other devices. In this manner, the optical transceiver 102 and the coherent DSP convert optical signals into electric data signals to be consumed by other devices.

In summary, an optical transceiver 102 maps an OTU4 signal into a FlexO frame. The optical transceiver 102 refrains from interleaving the OTU4 signal into an ODUC signal before mapping the OTU4 signal to the FlexO frame. The optical transceiver 102 then communicates the FlexO frame over an FOIC to a coherent DSP 104, which terminates the FlexO frame and the mapped OTU4 signal. In this manner, the optical transceiver 102 converts the OTU4 signal to a PAM4 signal for the coherent DSP 104 without using an aggregation device, which reduces circuit size and reduces electrical power consumption, in particular embodiments. Additionally, the optical transceiver 102 may use the available bandwidth more efficiently than implementations that use QSFP28 implementations.

As discussed above, conventional implementations may use a QSFP28 to map an OTU4 signal to OTL4.4 supporting NRZ. These implementations may include four QSFP28 pluggables that receive a total of four OTU4 signals and that map these OTU4 signals to a total of sixteen OTL lanes supporting NRZ. An aggregation device then frames the NRZ signals into a smaller number of lanes (e.g., four or eight lanes) supporting PAM4 for a coherent DSP, resulting in five QSFP cages and a large aggregation device on a host card. The aggregation device, however, is large in size and consumes large amounts of electrical power. Additionally, only a portion (e.g., half) of the available bandwidth is used.

By contrast, the optical transceiver 102 may be a QSFP that converts OTU4 signals to PAM4 without using an aggregation device. For example, the optical transceiver 102 may convert four OTU4 signals into four PAM4 signals for a coherent DSP 104. Specifically, the optical transceiver 102 maps the OTU4 signals to FlexO frames without performing the intermediate step of mapping the OTU4 signals to ODUC signals. As a result, the optical transceiver 102 and the coherent DSP 104 may be implemented using only two QSFP cages on a host card without an aggregation device. Because the host card does not include or use the aggregation device, the size and electric power consumption of the host card are reduced relative to conventional implementations.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   mapping, by an optical transceiver, a received first optical channel transport unit 4 (OTU4) signal to a first flexible optical transport network (FlexO) frame without interleaving the first OTU4 signal into an optical data unit-C (ODUC) signal prior to mapping the first OTU4 signal to the first FlexO frame; and
   communicating, by the optical transceiver, the first FlexO frame with the mapped first OTU4 signal to a coherent digital signal processor (coherent DSP) over a first FlexO electrical interface (FOIC).

2. The method of claim 1, further comprising applying, to the first OTU4 signal, forward error correction indicated by the first OTU4 signal prior to mapping the first OTU4 signal to the first FlexO frame.

3. The method of claim 2, further comprising removing, from the OTU4 signal, the forward error correction indicated by the first OTU4 signal.

4. The method of claim 1, wherein the coherent DSP terminates the first FlexO frame.

5. The method of claim 1, wherein the first FOIC comprises only one lane or two lanes.

6. The method of claim 1, further comprising:
   mapping a second OTU4 signal to a second FlexO frame, a third OTU4 signal to a third FlexO frame, and a fourth OTU4 signal to a third FlexO frame; and
   communicating the second FlexO frame, the third FlexO frame, and the fourth FlexO frame to the coherent DSP over a second FOIC, a third FOIC, and a fourth FOIC, respectively.

7. The method of claim 6, wherein the first FlexO frame, the second FlexO frame, the third FlexO frame, and the fourth FlexO frame are generated using a same clock.

8. An optical transceiver comprising:
   a first port configured to receive a first OTU4 signal; and
   a framer circuit configured to:
      map the first OTU4 signal to a first FlexO frame; and
      communicate the first FlexO frame with the mapped first OTU4 signal to a coherent DSP over a first FOIC.

9. The optical transceiver of claim 8, wherein the framer circuit is further configured to apply, to the first OTU4 signal, forward error correction indicated by the first OTU4 signal prior to mapping the first OTU4 signal to the first FlexO frame.

10. The optical transceiver of claim 9, wherein the framer circuit is further configured to remove, from the OTU4 signal, the forward error correction indicated by the first OTU4 signal.

11. The optical transceiver of claim 8, wherein the coherent DSP terminates the first FlexO frame.

12. The optical transceiver of claim 8, wherein the first FOIC comprises only one lane or two lanes.

13. The optical transceiver of claim 8, wherein the framer circuit is further configured to:
   map a second OTU4 signal to a second FlexO frame, a third OTU4 signal to a third FlexO frame, and a fourth OTU4 signal to a third FlexO frame; and
   communicate the second FlexO frame, the third FlexO frame, and the fourth FlexO frame to the coherent DSP over a second FOIC, a third FOIC, and a fourth FOIC, respectively.

14. The optical transceiver of claim 13, wherein the first FlexO frame, the second FlexO frame, the third FlexO frame, and the fourth FlexO frame are generated using a same clock.

15. A system comprising:
   a coherent DSP; and
   an optical transceiver configured to:
      map a received first OTU4 signal to a first FlexO frame; and
      communicate the first FlexO frame with the mapped first OTU4 signal to the coherent DSP over a first FOIC.

16. The system of claim 15, wherein the optical transceiver is further configured to apply, to the first OTU4 signal, forward error correction indicated by the first OTU4 signal prior to mapping the first OTU4 signal to the first FlexO frame.

17. The system of claim 15, wherein the optical transceiver is further configured to refrain from applying forward error correction to the first OTU4 signal prior to mapping the first OTU4 signal to the first FlexO frame.

18. The system of claim 15, wherein the coherent DSP terminates the first FlexO frame.

19. The system of claim 15, wherein the first FOIC comprises only one lane or two lanes.

20. The system of claim 15, wherein the optical transceiver is further configured to:
   map a second OTU4 signal to a second FlexO frame, a third OTU4 signal to a third FlexO frame, and a fourth OTU4 signal to a third FlexO frame; and
   communicate the second FlexO frame, the third FlexO frame, and the fourth FlexO frame to the coherent DSP over a second FOIC, a third FOIC, and a fourth FOIC, respectively.

* * * * *

UNITED STATES PATENT AND TRADEMARK OFFICE
CERTIFICATE OF CORRECTION

PATENT NO. : 11,637,632 B2
APPLICATION NO. : 17/647277
DATED : April 25, 2023
INVENTOR(S) : Gilberto Loprieno et al.

It is certified that error appears in the above-identified patent and that said Letters Patent is hereby corrected as shown below:

On the Title Page

In item (72), in Column 1, in "Inventors", Line 1, delete "Millano (IT);" and insert -- Milano (IT); --.

In the Specification

In Column 4, Line 19, delete "OTU" and insert -- OTU4 --.

In the Claims

In Column 10, Lines 47-48, in Claim 6, delete "a fourth OTU4 signal to a third FlexO frame;" and insert -- a fourth OTU4 signal to a fourth FlexO frame; --.

In Column 11, Lines 12-13, in Claim 13, delete "a fourth OTU4 signal to a third FlexO frame;" and insert -- a fourth OTU4 signal to a fourth FlexO frame; --.

In Column 12, Lines 20-21, in Claim 20, delete "a fourth OTU4 signal to a third FlexO frame;" and insert -- a fourth OTU4 signal to a fourth FlexO frame; --.

Signed and Sealed this
Fourth Day of July, 2023

*Katherine Kelly Vidal*
Katherine Kelly Vidal
*Director of the United States Patent and Trademark Office*